(12) United States Patent  
Takane

(10) Patent No.: US 7,853,423 B2
(45) Date of Patent: Dec. 14, 2010

(54) IMAGE FORMING APPARATUS AND METHOD FOR CORRECTING POSITION DISPLACEMENT

(75) Inventor: Toshiaki Takane, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 100 days.

(21) Appl. No.: 12/336,905

(22) Filed: Dec. 17, 2008

(65) Prior Publication Data

US 2009/0171609 A1  Jul. 2, 2009

(30) Foreign Application Priority Data

Dec. 28, 2007 (JP) ............................. 2007-340894
Dec. 11, 2008 (JP) ............................. 2008-316025

(51) Int. Cl.
G01C 17/38 (2006.01)

(52) U.S. Cl. ........................................ 702/94; 702/197

(58) Field of Classification Search .................. 702/94, 702/95, 195, 197; 399/40, 301
See application file for complete search history.

(56) References Cited

U.S. PATENT DOCUMENTS 7,366,444 B2   4/2008  Takane
7,640,142 B2 * 12/2009  Tachikawa et al. .......... 702/197

FOREIGN PATENT DOCUMENTS

| JP | 2000-066463 | 3/2000 |
|---|---|---|
| JP | 2001-066842 | 3/2001 |
| JP | 2002-182448 | 6/2002 |
| JP | 2005-233983 | 9/2005 |
| JP | 2006-084579 | 3/2006 |
| JP | 2006-201341 | 8/2006 |
| JP | 2006-201342 | 8/2006 |
| JP | 2006-297697 | 11/2006 |

* cited by examiner

*Primary Examiner*—John H Le
(74) *Attorney, Agent, or Firm*—Ipusa, PLLC

(57) ABSTRACT

A disclosed image forming apparatus for detecting position displacement patterns and correcting position displacement of an image forming position in a main scanning direction according to the detection result, includes a position displacement amount calculating part configured to calculate the amount of the position displacement according to the detection result, a position displacement correcting part configured to correct the position displacement by performing at least one of multiplication correction or multiplication error deviation correction, a correction amount calculating part configured to calculate a multiplication error deviation correction amount for correcting multiplication error deviation generated by the multiplication correction, a first determining part configured to determine whether to plot a first position displacement correction pattern included in the position displacement patterns for performing the multiplication error deviation correction according to the multiplication error deviation correction amount, and a plotting part configured to plot the position displacement correction patterns.

5 Claims, 11 Drawing Sheets

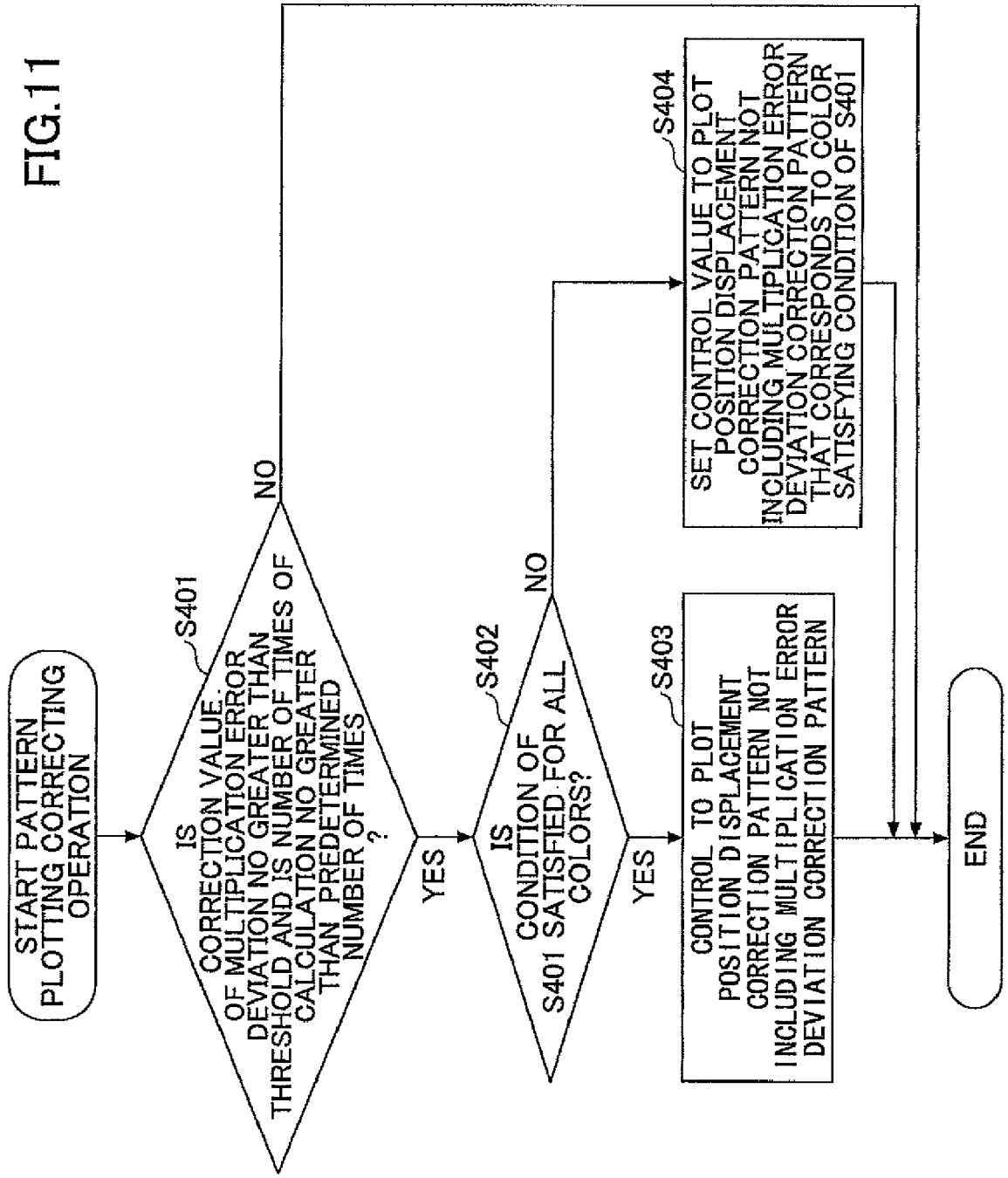

IMAGE FORMING APPARATUS AND METHOD FOR CORRECTING POSITION DISPLACEMENT

BACKGROUND OF THE INVENTION

1. Field of the Invention

The present invention relates to an image forming apparatus and a method for correcting position displacement.

2. Description of the Related Art

A tandem type image forming apparatus forms color images by using image forming parts (imaging parts) corresponding to different colors (e.g., black (BK), cyan (C), magenta (M), yellow (Y)) and superposing toner images of each color onto paper (recording medium) or a transfer belt.

This type of image forming apparatus may face a problem of color displacement which is caused by toner images of each color deviating from a target position where the toner images are to be superposed. Therefore, with this type of image forming apparatus, position displacement is corrected by forming a position displacement correction pattern (toner mark pattern), detecting the position at which each image is formed by using a pattern detecting part (e.g., TM (Toner Mark) sensor), measuring the displacement amount (amount of displacement with respect to a target position) by referring to the toner mark pattern, and calculating the correction amount (amount of displacement to be corrected). Thereby, occurring of color displacement can be reduced and color images can be consistently formed.

However, after a substantial amount of time elapses after the correcting of position displacement, position displacement may reoccur. Therefore, the image forming apparatus is required to repeat the position displacement correcting operation. This increases the consumption amount of toner used for forming the position displacement correction patterns.

In order to the reduce the toner consumption amount, there is proposed a method of reducing the number of times for forming position displacement correction patterns or a method of reducing the size of the position displacement correction patterns (see, for example, Japanese Laid-Open Patent Publication Nos. 2000-066463 and 2005-233983).

Even in a case where multiplication error deviation having little effect on formation of color images occurs, the proposed methods form position displacement correction patterns at a center area for correcting the multiplication error deviation. Because position displacement correction patterns are formed even in the case where correction of multiplication error deviation is unnecessary, toner is wasted.

SUMMARY OF THE INVENTION

The present invention may provide an image forming apparatus and a method for correcting position displacement that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus and a method for correcting position displacement particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming apparatus for detecting position displacement patterns and correcting position displacement of an image forming position in a main scanning direction according to the detection result, including: a position displacement amount calculating part configured to calculate the amount of the position displacement according to the detection result; a position displacement correcting part configured to correct the position displacement by performing at least one of multiplication correction or multiplication error deviation correction; a correction amount calculating part configured to calculate a multiplication error deviation correction amount for correcting multiplication error deviation generated by the multiplication correction; a first determining part configured to determine whether to plot a first position displacement correction pattern included in the position displacement patterns for performing the multiplication error deviation correction according to the multiplication error deviation correction amount; and a plotting part configured to plot the position displacement correction patterns.

Further, another embodiment of the present invention provides a position displacement correcting method of an image forming apparatus for detecting position displacement patterns and correcting position displacement of an image forming position in a main scanning direction according to the detection result, including the steps of: a) calculating the amount of the position displacement according to the detection result; b) correcting the position displacement by performing at least one of multiplication correction or multiplication error deviation correction; c) calculating a multiplication error deviation correction amount for correcting multiplication error deviation generated by the multiplication correction; d) determining whether to plot a first position displacement correction pattern included in the position displacement patterns for performing the multiplication error deviation correction according to the multiplication error deviation correction amount; and e) plotting the position displacement correction patterns.

Other objects, features and advantages of the present invention will become more apparent from the following detailed description when read in conjunction with the accompanying drawings.

BRIEF DESCRIPTION OF THE DRAWINGS

FIG. 11 is a flowchart illustrating the steps of yet another pattern plotting control operation according to an embodiment of the present invention.

DETAILED DESCRIPTION OF THE PREFERRED EMBODIMENTS

First Embodiment

<Hardware Configuration>

Figure 1:
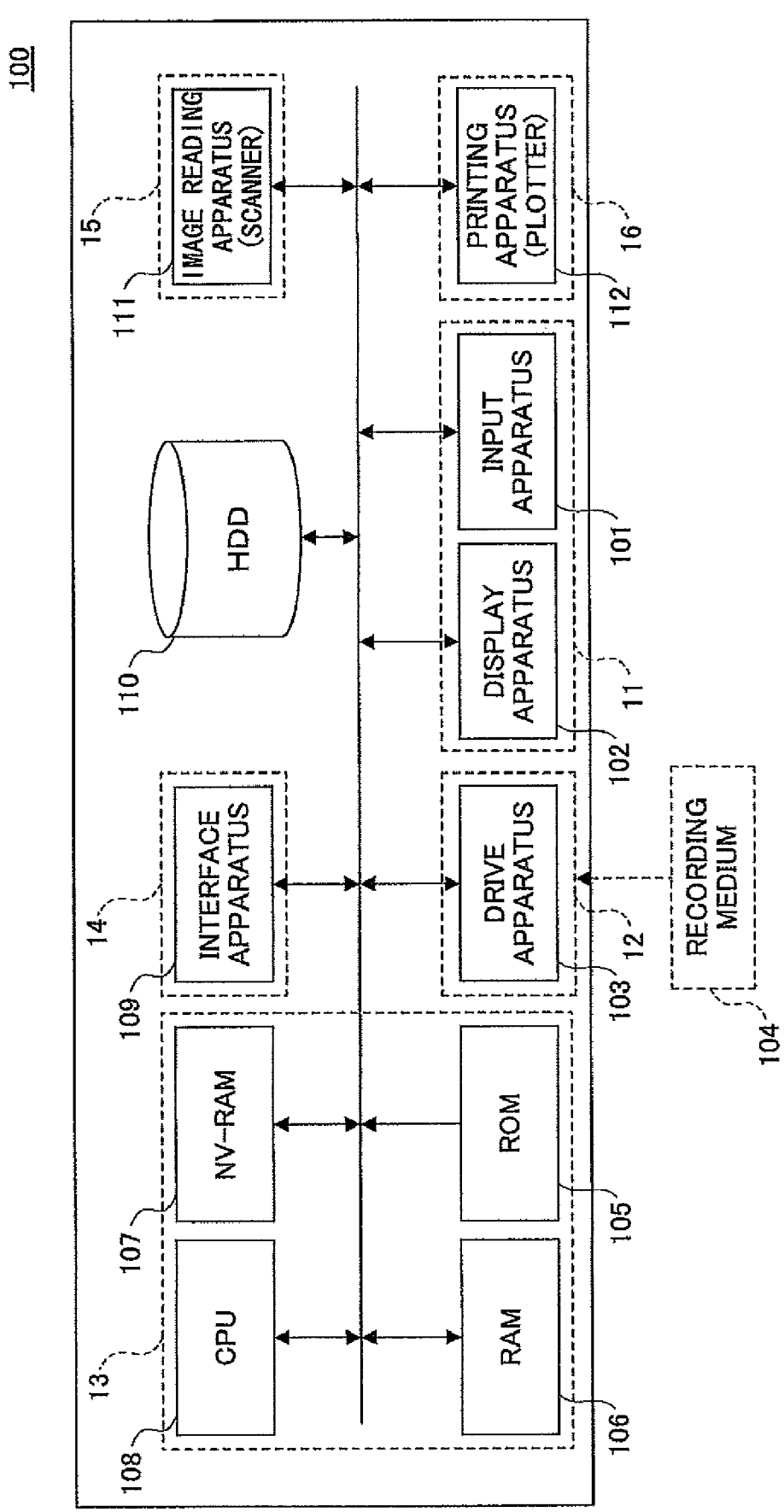
FIG. 1 is a schematic diagram illustrating an example of a hardware configuration of an image forming apparatus according to an embodiment of the present invention.

First, a hardware configuration of an image forming apparatus 100 according to an embodiment of the present invention is described. FIG. 1 is a schematic diagram illustrating an example of a hardware configuration of the image forming apparatus 100.

In FIG. 1, the image forming apparatus 100 includes a control panel 11, an external storage interface (I/F) 12, a controller 13, a data communications I/F 14, an HDD (Hard Disk Drive) 110, a scanner 15, and a plotter 16 that are connected by a bus.

The control panel 11 includes an input apparatus 101 and a display apparatus 102. The input apparatus 101 includes, for example, hardware keys used for inputting control signals to the image forming apparatus 100. Further, the display, apparatus 102 includes, for example, a display for displaying various information items regarding image processing operations (e.g., operating conditions).

The data communications I/F 14 includes an interface apparatus 109 for connecting the image forming apparatus 100 to a data communications network by a wired and/or wireless channel(s).

The HDD 110 is configured to store various data handled by the image forming apparatus 100 (e.g., image data). The various data are managed in a predetermined file system or a database (DB) in the HDD 110.

The external storage I/F 12 includes a drive apparatus 103. The drive apparatus 103 is an interface for connecting the image forming apparatus 100 to a recording medium 104 (e.g., flash memory device). By using the external storage I/F 12, data can be exchanged between the image forming apparatus 100 and the recording medium 104. For example, the recording medium 104 may be used to install an application program in the image forming apparatus 100.

The controller 13 includes a ROM (Read Only Memory) 105, a RAM (Random Access Memory) 106, a NV-RAM (Non-Volatile RAM) 107, and a CPU (Central Processing Unit) 108.

The ROM 105 stores various programs and data for controlling the entire image forming apparatus 100 such as basic software and application software. Further, the RAM 106 temporarily stores a program(s) or data read out from, for example, the ROM 105 or the HDD 110. The NV-RAM 107 stores data for controlling the image forming operations performed by the image forming apparatus 100 (e.g., initial settings). Further, the CPU 108 executes a read out program(s) stored in the RAM 106. The controller 13 controls the entire image forming apparatus 100 by the CPU 108 executing the program read out from the ROM 105 and stored in the RAM 106.

The scanner 15 includes an image reading apparatus 111 for optically reading a document placed on an image reading plane (not shown) of the image forming apparatus 100 and generating image data read from the document. The plotter 16 includes a tandem type printing apparatus 112. For example, the printing apparatus 112 prints a bitmap image transferred from the controller 13 onto a sheet of paper by using an electrophotographic method. It is, however, to be noted that the method for forming an image (e.g., printing an image on a sheet(s) of paper) is not limited to the electrophotographic method.

<Position Displacement Correcting Function>

Next, an embodiment of a position displacement correcting function is described.

Figure 2:
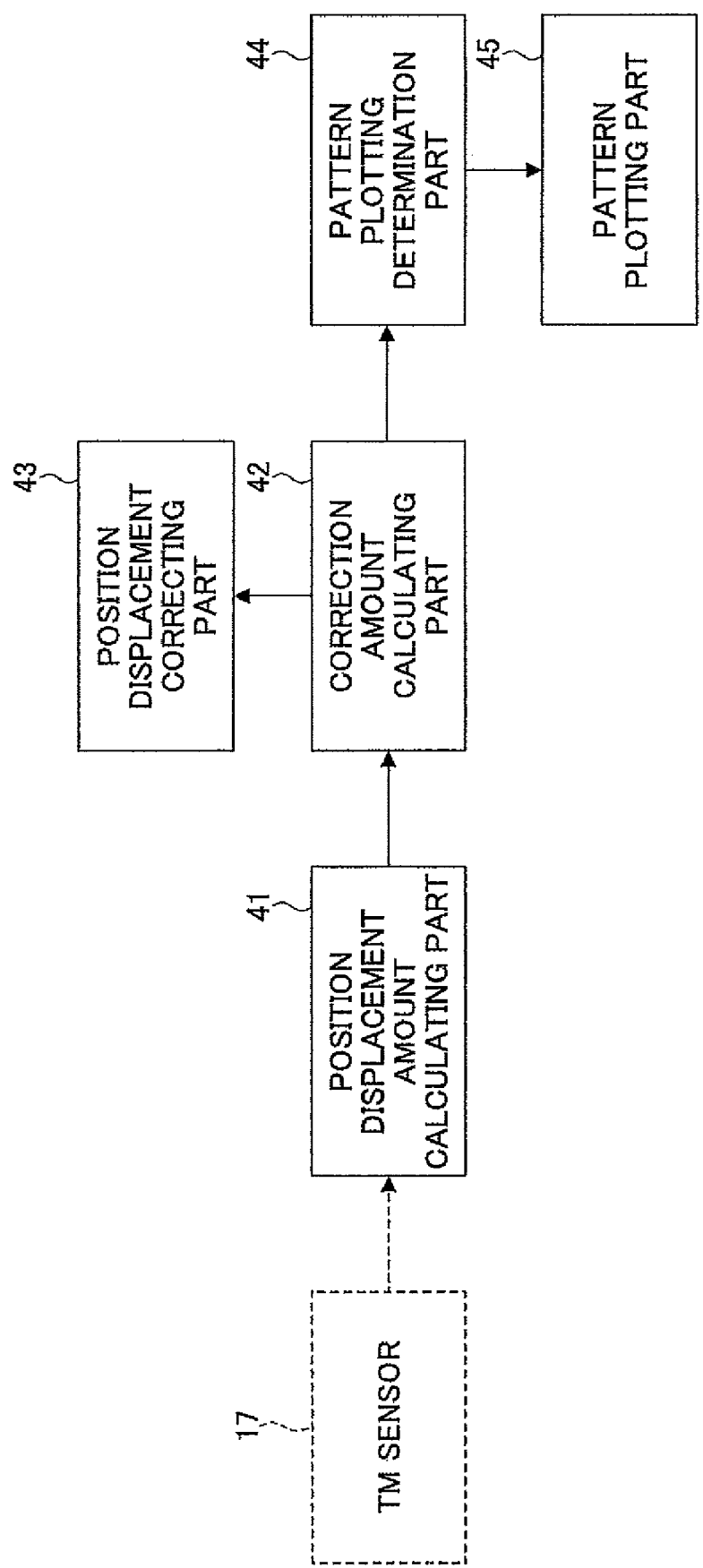
FIG. 2 is a schematic diagram illustrating an example of a functional configuration included in an image forming apparatus according to an embodiment of the present invention.

FIG. 2 is a schematic diagram illustrating an example of a functional configuration included in the image forming apparatus 100 according to an embodiment of the present invention.

In FIG. 2, the image forming apparatus 100 includes a position displacement amount calculating part 41, a correction amount calculating part 42, a position displacement correcting part 43, a pattern plotting determination part 44, and a pattern plotting part 45.

The position displacement amount calculating part 41 calculates the amount of position displacement in the main scanning direction (position displacement amount) according to detection signals input from a pattern detecting part (e.g., TM sensor 17) (extracting of position displacement components).

The correction amount calculating part 42 calculates the amount of correction required for correcting the position displacement in the main scanning direction (main scanning direction correction amount) according to the position displacement amount calculated by the position displacement amount calculating part 41. Further, the correction amount calculating part 42 calculates the amount of correction required for correcting multiplication error deviation (multiplication error deviation correction amount) according to the calculated main scanning direction correction amount.

The position displacement correcting part 43 corrects the position at which an image is formed (image forming position) according to the main scanning direction correction amount calculated by the correction amount calculating part 42.

The pattern plotting determination part 44 determines whether to plot a position displacement correction pattern for correcting multiplication error deviation according to the multiplication error deviation correction amount calculated by the correction amount calculating part 42.

The pattern plotting part 45 plots a position displacement correction pattern(s) according to the result of the determination (determination result) by the pattern plotting determination part 44.

The above-described function parts 41-45 of the image forming apparatus 100 may be realized by reading a position displacement correction program installed in the image forming apparatus 100, reading out the position displacement correction program to the RAM 106, and executing the position displacement correction program with the CPU 108.

Next, an embodiment of a position displacement correction function is described with reference to FIG. 3.

Figure 3:
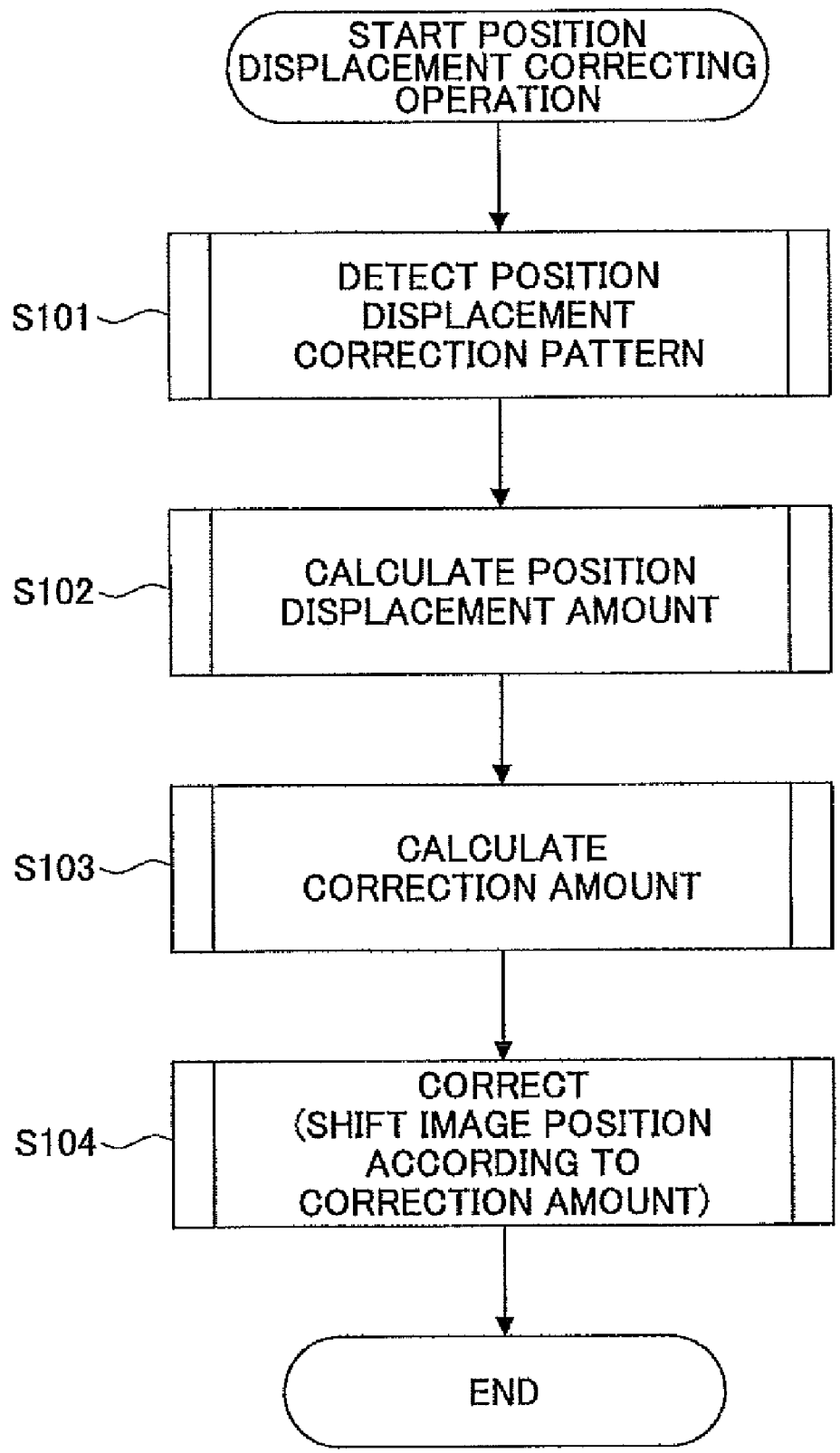
FIG. 3 is a flowchart illustrating steps of a position displacement correcting operation according to an embodiment of the present invention.

FIG. 3 is a flowchart illustrating steps of a position displacement correcting operation according to an embodiment of the present invention. The steps of the position displacement correcting operation are described in detail with reference to FIGS. 4 through 8.

The position displacement correction in this embodiment is performed according to the image forming position corresponding to black (BK). That is, in this embodiment, the image forming position corresponding to black serves as a reference position for performing the position displacement correcting operation (image forming reference position). Accordingly, the image forming positions corresponding to cyan (C), magenta (M), and yellow (Y) are corrected by matching their positions with the image forming reference position.

First, the image forming apparatus 100 according to an embodiment of the present invention detects the distance (separation distance) between a horizontal pattern and a diagonal pattern of a position displacement correction pattern according to results of position displacement correction pattern detection performed by the pattern detecting part 17 (Step S101). The detection of position displacement correction patterns is described below with reference to FIG. 4.

(Detection of Positional Detection Correction Patterns)

Figure 4:
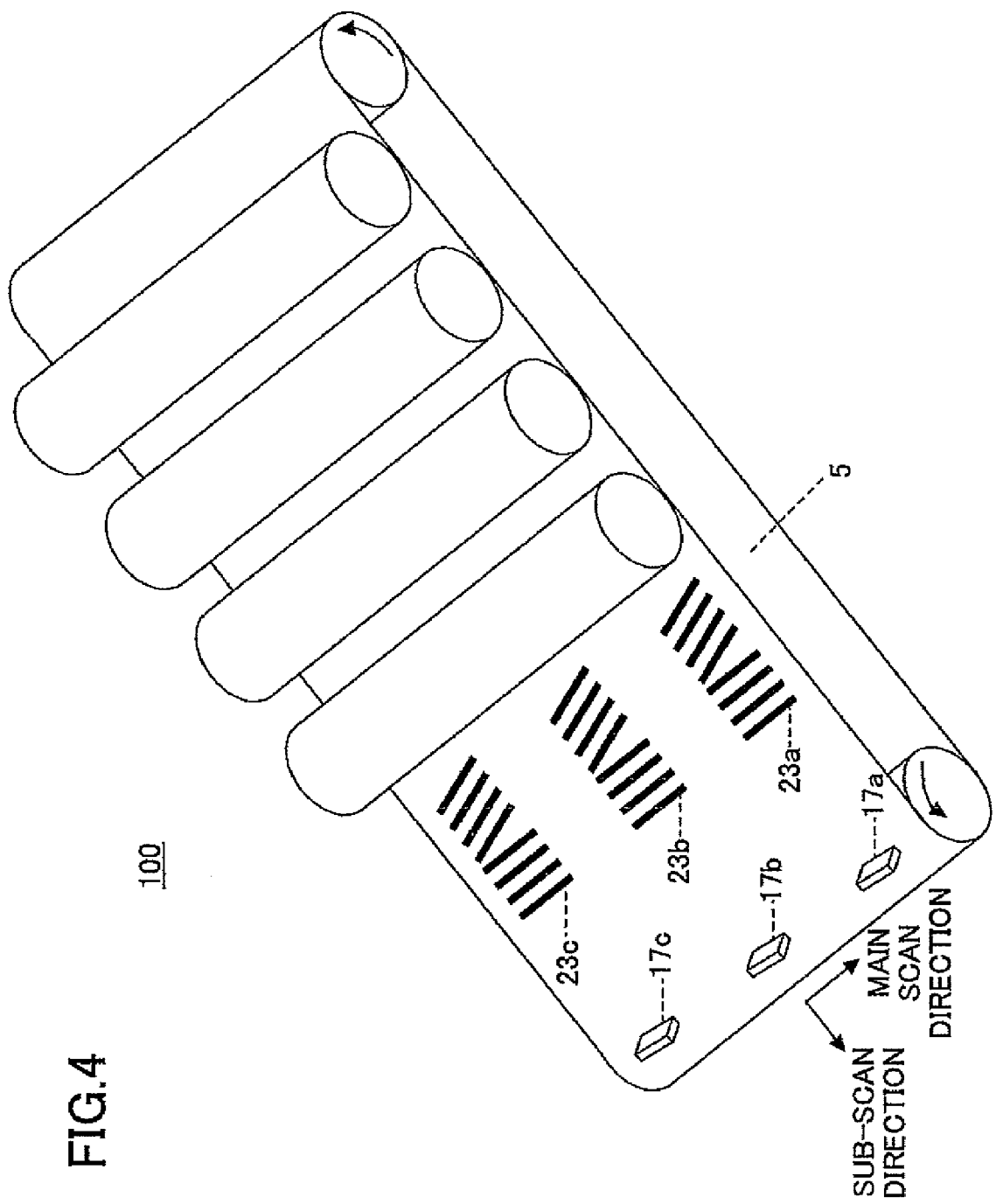
FIG. 4 is a schematic diagram illustrating TM sensors 17 and peripheral components surrounding the TM sensors 17 that are provided inside an image forming apparatus according to an embodiment of the present invention.

FIG. 4 is a schematic diagram illustrating the TM sensor(s) 17 (17a, 17b, 17c) and peripheral components surrounding the TM sensor 17 that are provided inside the image forming apparatus 100 according to an embodiment of the present invention.

In the image forming apparatus 100 illustrated in FIG. 4, TM sensors 17a, 17b, 17c are supported on the same substrate in a main scanning direction and are positioned facing a conveyor belt 5.

Further, position displacement correction patterns 23a, 23b, 23c, which are used for correcting multiplication error deviation, are plotted on the conveyor belt 5 by the pattern plotting part 45. In FIG. 4, the position displacement correction patterns 23a, 23b, 23c are arranged in the main scanning direction on three parts of the conveyor belt 5 where one pattern 23b is plotted substantially at the center of the conveyor belt 5 and two patterns 23a, 23c are plotted on the left and right sides of the conveyor belt 5. The position displacement correction patterns 23 (23a, 23b, 23c) include horizontal and diagonal patterns formed in an order of black (BK), cyan (C), magenta (M), and yellow (Y) from a downstream side of a conveying direction of the conveyor belt 5.

Accordingly, the TM sensor 17 (17a, 17b, 17c) is arranged in correspondence with the position at which the position displacement correction pattern 23 (23a, 23b, 23c) is formed substantially at the center and the left/right sides in the main scanning direction.

The TM sensor 17 optically detects the position displacement correction pattern 23 formed on the conveyor belt 5. The TM sensor 17 transmits a detection signal(s) indicating the detection results to the CPU 108 via a bus. Accordingly, the distance between the horizontal pattern of the position displacement correction pattern and the diagonal pattern of the position displacement correction pattern (separation distance) can be detected.

Then, returning to the position displacement correcting operation of FIG. 3, the image forming apparatus 100 uses the correction amount calculating part 42 to calculate the position displacement amount according to the separation distance detected in Step S101 (Step S102).

(Calculation of Position Displacement Amount)

Figure 5:
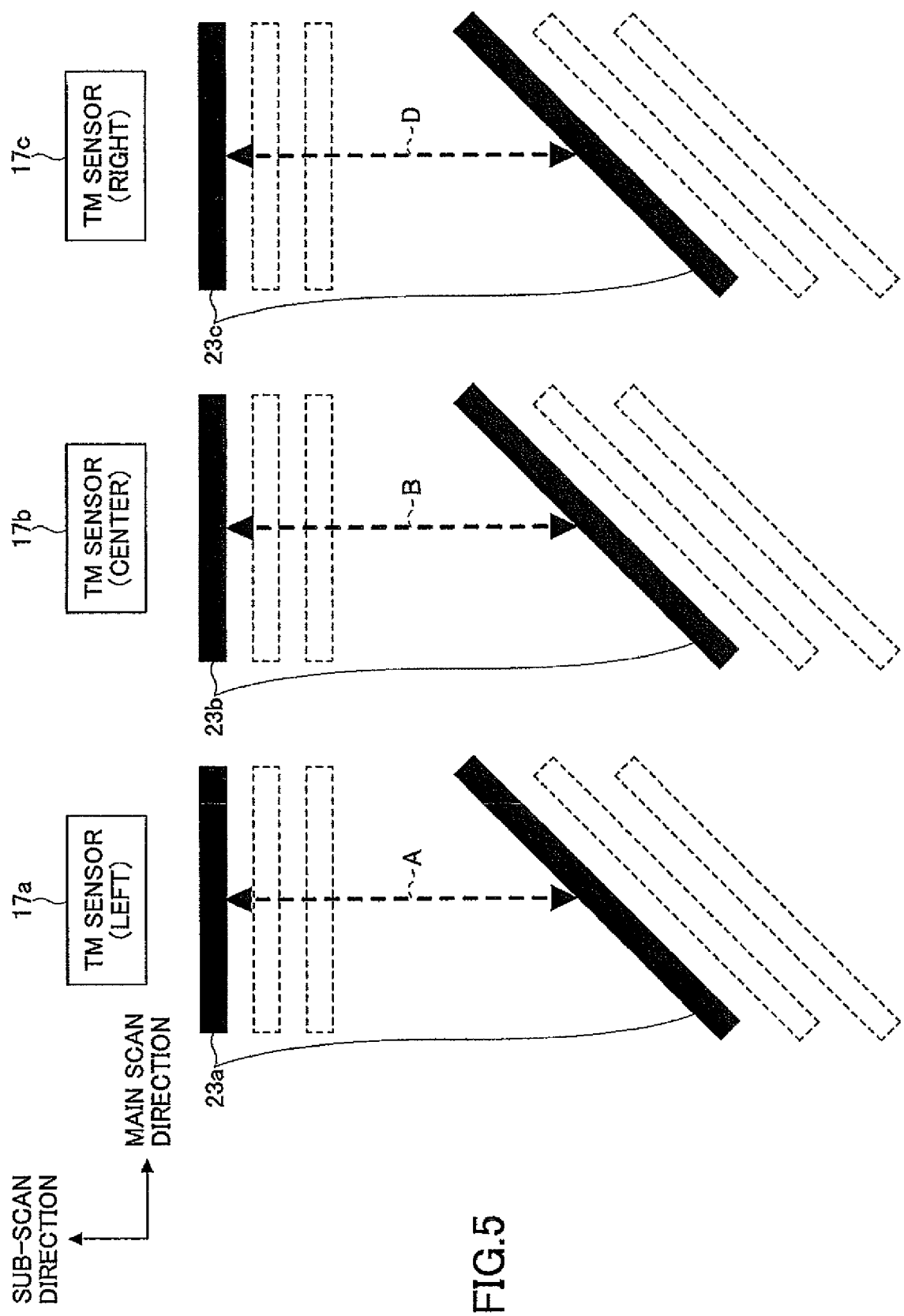
FIG. 5 is a schematic diagram for describing an example of extracting position displacement components according to an embodiment of the present invention.

FIG. 5 is a schematic diagram for describing an example of extracting position displacement components according to an embodiment of the present invention. In FIG. 5, separation distances between detected horizontal patterns and diagonal patterns detected by the TM sensors 17a, 17b, 17c are indicated as A, B, and D, respectively. More specifically, the separation distance A is the separation distance between the horizontal and diagonal patterns of the position displacement correction pattern 23a formed at the left side of the conveyor belt 5 in the conveying direction (sub-scanning direction). The separation distance B is the separation distance between the horizontal and diagonal patterns of the position displacement correction pattern 23b formed at the center of the conveyor belt 5 in the conveying direction (sub-scanning direction). The separation distance D is the separation distance between the horizontal and diagonal patterns of the position displacement correction pattern 23c formed at the right side of the conveyor belt 5 in the conveying direction (sub-scanning direction).

The position displacement amount calculating part 41 calculates the position displacement amount by subtracting a predetermined reference separation distance from the above-described separation distances A, B, and D. In this embodiment, the reference separation distance is the separation distance of the horizontal pattern and the diagonal pattern corresponding to black (BK). Thus, instead of setting the value of the reference separation distance beforehand, the reference separation distance can be obtained by detecting the separation distance of the horizontal pattern and the diagonal pattern corresponding to black by using the TM sensor 17.

For example, in a case where the reference separation distance is L, the position displacement amount calculating part 41 can obtain position displacement amount a, b, and d corresponding to the position displacement correction pattern 23 formed on the right side, the center, and the left side of the conveyor belt 5 as follows.

[Formula 1-1]

Position displacement amount of left side:

$$a=(A-L)$$

[Formula 1-2]

Position displacement amount of center:

$$b=(B=L)$$

[Formula 1-3]

Position displacement amount of right side:

$$d=(D-L)$$

The position displacement amount a, b, and d can be regarded as the position displacement amounts in the main scanning direction because the angle of the diagonal patterns 23a, 23b, 23c of the position displacement correction patterns 23 is 45 degrees as illustrated in FIG. 5.

Returning to the position displacement correcting operation of FIG. 3, the image forming apparatus 100 uses the correction amount calculating part 42 to calculate the correction amounts based on the position displacement amounts a, b, and d calculated in Step S102 (Step S103).

(Calculation of Correction Coefficient for Multiplication Correction)

Figure 6:
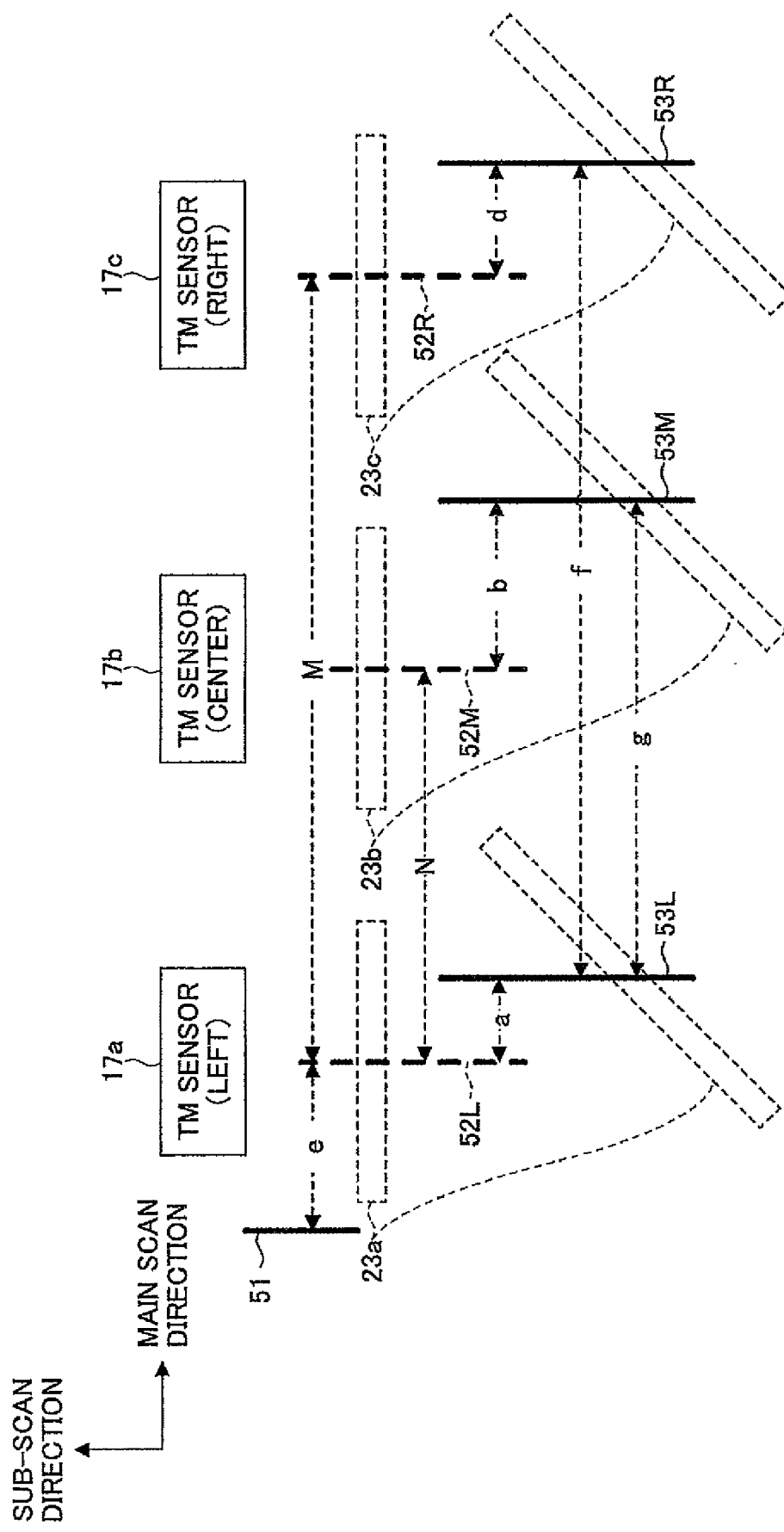
FIG. 6 is a schematic diagram illustrating displacement of position displacement correction patterns before multiplication correction is performed according to an embodiment of the present invention.

FIG. 6 is a schematic diagram illustrating displacement of position displacement correction patterns before multiplication correction is performed according to an embodiment of the present invention. In this embodiment, a reference position(s) 52 (52L, 52M, 52R) represents the position at which the position displacement correction pattern 23 corresponding to black (BK) is formed, and a position displacement correction pattern position 53 represents the position at which the position displacement correction patterns 23 corresponding to cyan (C), magenta (M), and yellow (Y) are formed.

In FIG. 6, a separation distance f between a position displacement correction pattern position 53L of the left side (hereinafter referred to as "left position displacement correction pattern position") and a position displacement correction pattern position 53R of the right side (hereinafter referred to as "right position displacement correction pattern position 53R") can be calculated by subtracting a separation distance between an image forming start position 51 and the left position displacement correction pattern position 53L from a separation distance between the image forming start position 51 and the right position displacement correction pattern position 53R.

[Formula 2]

Separation distance before correction:

$$f=(e+M+d)-(e+a)$$

It is to be noted that "e" of Formula 2 represents the separation distance between the image forming start position 51 and a reference position 52L of the left side (hereinafter referred to as "left reference position 52L"). Further, "a" of Formula 2 represents the separation distance between the left reference position 52L and the left position displacement correction pattern position 53L. Further, "d" of Formula 2 represents the separation distance between a reference position 52R of the right side (hereinafter referred to as "right reference position 52R") and the right position displacement correction pattern position 53R.

In this embodiment, multiplication correction is a method where position displacement of position displacement correction patterns are corrected so that the separation distance f becomes equal to the separation distance M between the left reference position 52L and the right reference position 52R (f=M). Accordingly, a separation distance after correction is obtained by multiplying a correction coefficient p (coefficient for multiplication correction) with a right-hand side of Formula 2 (see Formula 3 below).

[Formula 2]

Separation distance after correction:

$$f=(e+M+d)\times p-(e+a)\times p$$

Further, the correction coefficient p can be obtained by converting Formula 3 to the following Formula 4.

[Formula 4]

Correction coefficient for multiplication correction:

$$p=M/(M+d-a)$$

The correction amount calculating part 42 calculates the correction coefficient p by using Formula 4. More specifically, the correction amount calculating part 42 calculates the separation distance M between the left reference position 52L and the right reference position 52R by referring to the image forming start position 51, the left reference position 52L, and the right reference position 52R. Then, the correction amount calculating part 42 substitutes the calculated separation distance M, the position displacement amount a calculated by the position displacement amount calculating part 41, and the position displacement amount d into Formula 4; thereby, obtaining the correction coefficient p.

(Calculation of Correction Amount by Position Displacement Correction Based on Correction Coefficient)

Figure 7:
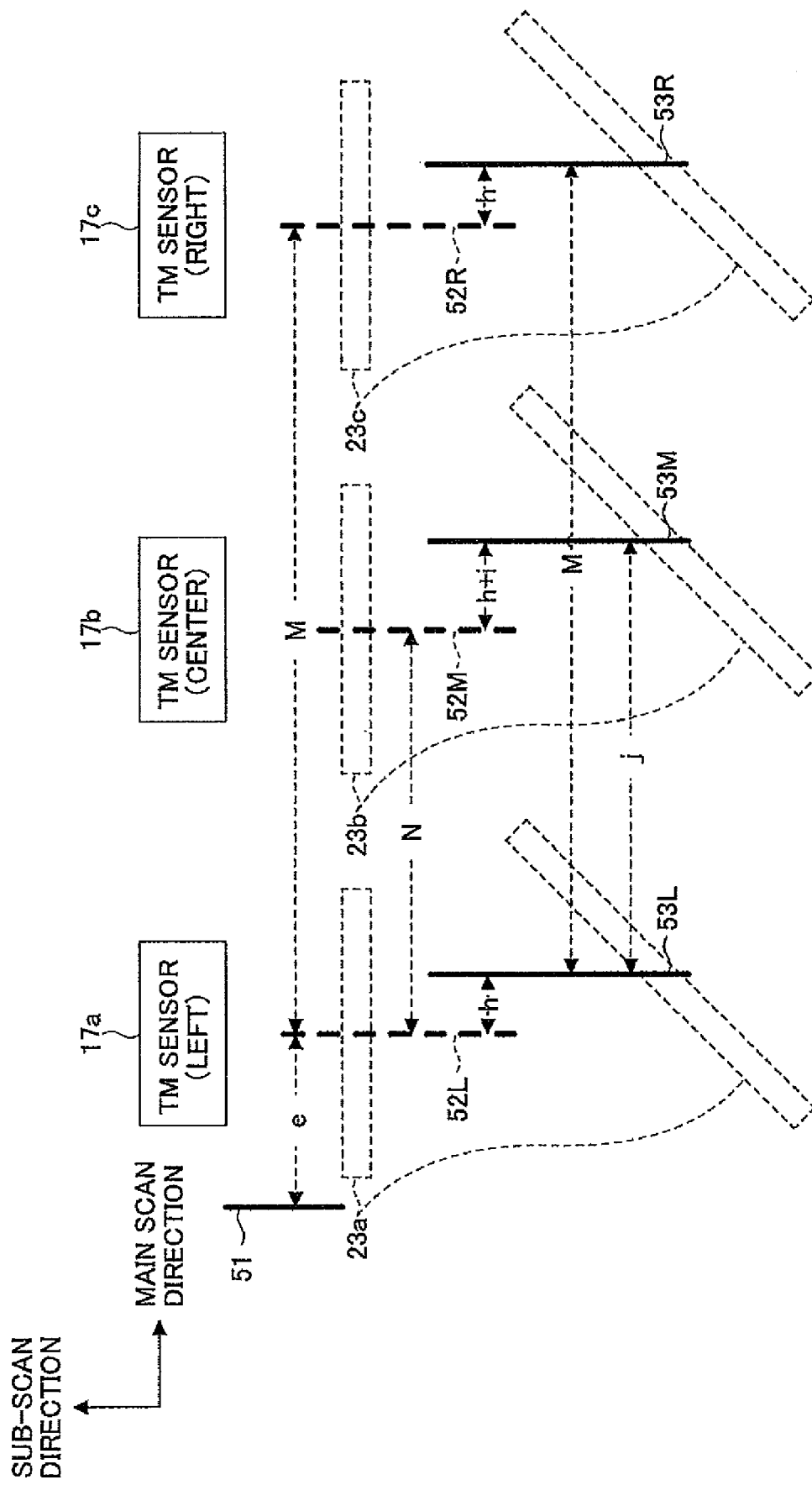
FIG. 7 is a schematic diagram illustrating displacement of position displacement correction patterns after multiplication correction is performed according to an embodiment of the present invention.

FIG. 7 is a schematic diagram illustrating displacement of position displacement correction patterns after multiplication correction is performed according to an embodiment of the present invention. With reference to FIGS. 6 and 7, the following relationship can be derived from the position displacement correction patterns before multiplication correction and the position displacement correction patterns after multiplication correction.

[Formula 5]

Position of the position displacement pattern of the left side:

$$(e+a)\times p=e+h$$

It is to be noted that "h" of Formula 5 represents the amount corrected by position displacement correction (position displacement correction amount).

Further, the position displacement correction amount h can be obtained by converting Formula 5 to the following Formula 6.

[Formula 6]

Position displacement correction amount:

$$h=e(p-1)+ap$$

The correction amount calculating part 42 calculates the position displacement correction amount h by using Formula 6. More specifically, the correction amount calculating part 42 calculates the separation distance e between the image forming start position 51 and the left reference position 52L by referring to the image forming start position 51 and the left reference position 52L. Then, the correction amount calculating part 42 substitutes the calculated separation distance e, the correction coefficient p, and the position displacement amount a into Formula 6; thereby, obtaining the position displacement correction amount h.

(Calculation of Correction Amount of Multiplication Error Deviation)

The separation distance between the image forming start position 51 and a position displacement correction pattern 53M at the center (hereinafter referred to as "center position displacement correction pattern 53M") can be calculated with the following formula.

[Formula 7]

Position displacement correction pattern position of center:

$$(e+N+b)\times p=e+N+h+i$$

Then, Formula 7 is converted into the following Formula 8 for calculating the amount the correction amount i of multiplication error deviation (hereinafter referred to as "multiplication error deviation correction amount").

[Formula 8]

Multiplication error deviation correction amount:

$$i=(e+N+b)\times p-e-N-h$$

The correction amount calculating part 42 calculates the multiplication error deviation correction amount i by using Formula 8. More specifically, the correction amount calculating part 42 calculates the separation distance N between the left reference position 52L and a reference position 52M of the center (hereinafter referred to as "center reference position 52M") by referring to the image forming start position 51, the left reference position 52L, and the reference position 52M. Then, the correction amount calculating part 42 substitutes the calculated separation distance N, the separation distance e, the correction coefficient p, the position displacement correction amount h, and the position displacement amount b into Formula 8; thereby, obtaining the multiplication error deviation correction amount i.

Accordingly, the correction amount calculating part 42 can calculate the position displacement correction amount h and the multiplication error deviation correction amount i.

Then, returning to the position displacement correcting operation of FIG. 3, the image forming apparatus 100 performs position displacement correction based on the position displacement correction amount h calculated in Step S103 (Step S104).

(Position Displacement Correction)

Figure 8:
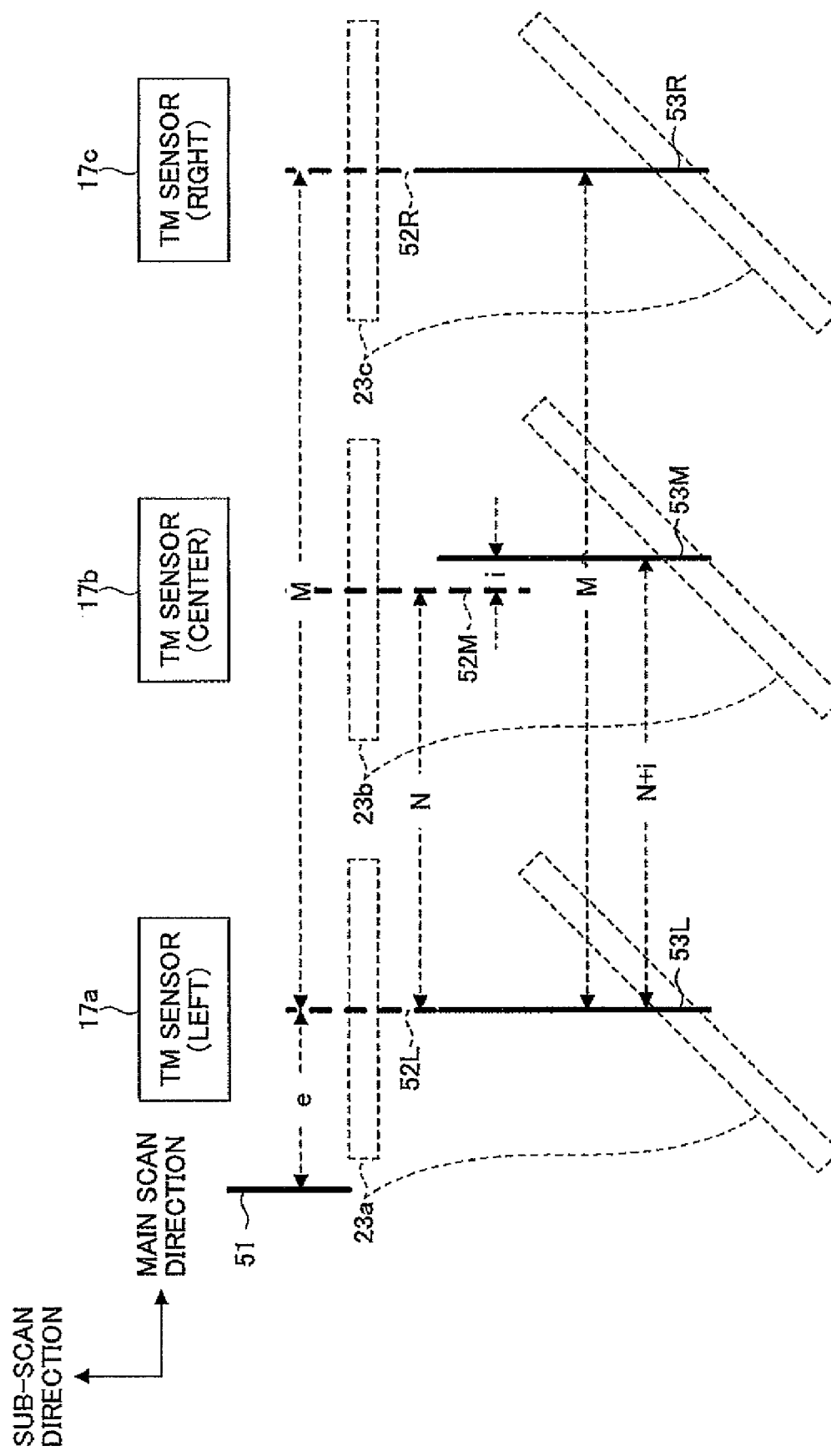
FIG. 8 is a schematic diagram illustrating position of patterns after position displacement correction is performed by multiplication correction according to an embodiment of the present invention.

FIG. 8 is a schematic diagram illustrating the position of patterns after position displacement correction is performed by multiplication correction according to an embodiment of the present invention.

The position displacement correction part 43 shifts an image forming position toward a corresponding reference position 52 (52L, 52M, 52R) in the main scanning direction in an amount equivalent to the position displacement correction amount h calculated in Step S103. As a result, the position of the left and right position displacement correction patterns 23*a*, 23*c* match the left and right reference positions 52L, 52R, respectively.

By performing the steps S101 through S104, the image forming apparatus 100 performs position displacement correction in the main scanning direction.

As illustrated in FIG. 8, there remains a separation distance between the center reference position 52M and the center position displacement correction pattern position 53M which is the multiplication error deviation correction amount i.

Accordingly, the image forming apparatus 100 performs correction so that the multiplication error deviation correction amount i becomes as close as possible to 0. However, if the multiplication error deviation correction amount were within a range having little effect on forming color images, there would be no need to correct the multiplication error deviation.

Therefore, in order to reduce the amount of toner consumed during position displacement correction, the image forming apparatus 100 according to an embodiment of the present invention uses the pattern plotting determination part 44 to determine whether it is necessary to plot a position displacement correction pattern 23*b* at the center (hereinafter also referred to as "multiplication error deviation correction pattern 23*b*") that is formed during multiplication error deviation correction. The image forming apparatus 100 controls the plotting of the multiplication error deviation correction pattern 23*b* of the pattern plotting part 45 according to the determination result.

Further, in the pattern plotting process, the plotting of the multiplication error deviation correction pattern 23*b* may also be determined (second determination part) based on other conditions besides the determination result of the pattern plotting determination part 44.

Examples of the other conditions for determining whether to plot the multiplication error deviation correction pattern 23*b* are as follows.

(Conditions for Plotting Multiplication Error Deviation Patterns)

(Condition 1)

A case of recommencing supplying of power by re-activating power of the image forming apparatus 100 after switching off the power of the image forming apparatus 100.

(Condition 2)

A case where the image forming apparatus 100 is delivered to the user, that is, a case where power of the image forming apparatus 100 is switched on for the first time.

(Condition 3)

A case where a components) of the image forming apparatus 100 used for an image forming operation (e.g., transfer belt (image transferring member), photoconductor drum (image carrier)) is replaced.

Figure 9:
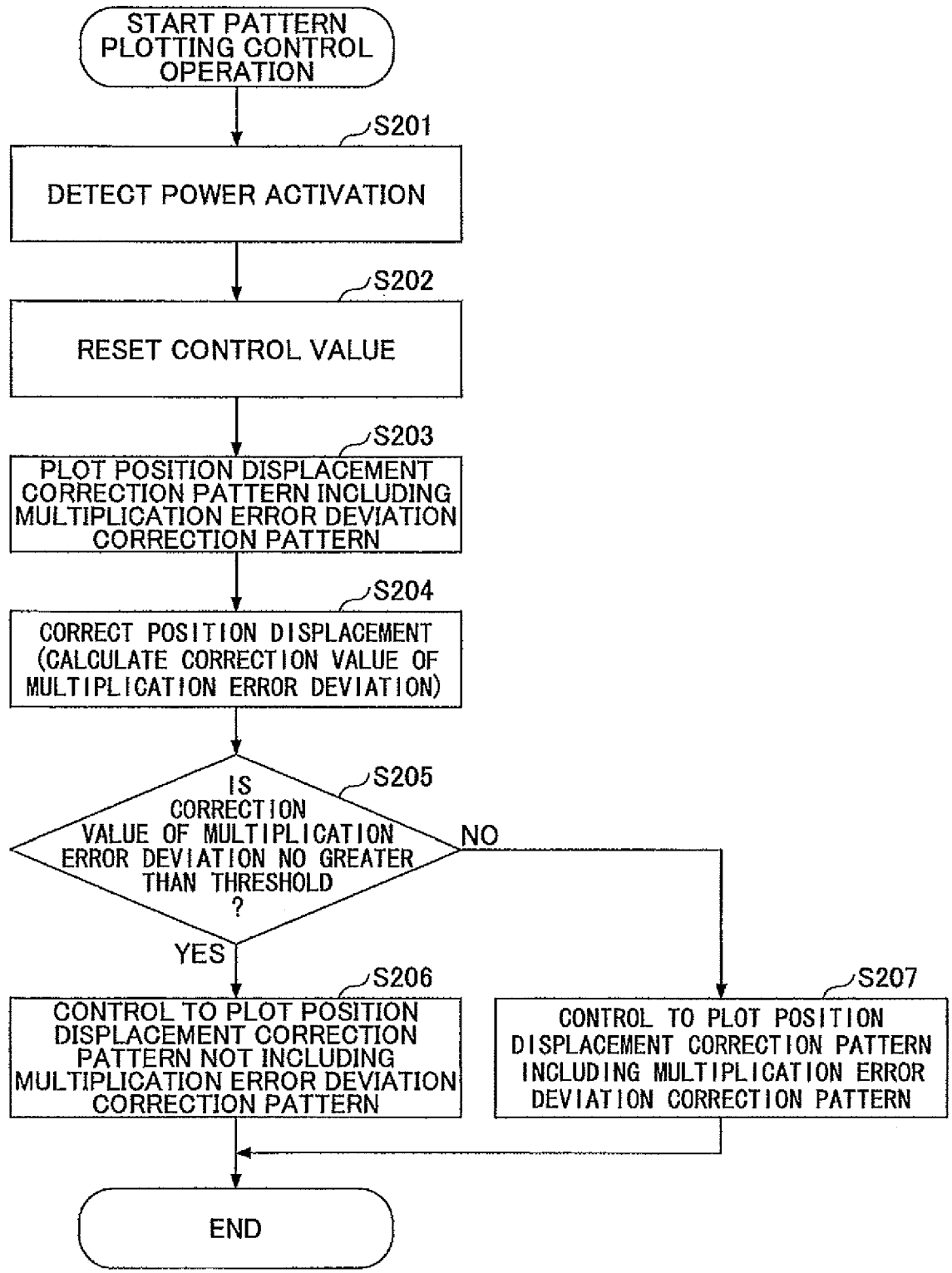
FIG. 9 is a flowchart illustrating the steps of one pattern plotting control operation according to an embodiment of the present invention.

FIG. 9 is a flowchart illustrating the steps of a pattern plotting control operation according to an embodiment of the present invention. In FIG. 9, the steps of the pattern plotting controlling operation are performed according to conditions 1 and 2.

The image forming apparatus 100 detects activation (switching on) of power of the image forming apparatus 100 (Step S201).

When the image forming apparatus 100 detects the switching on of power, the image forming apparatus 100 resets a control value(s) used for controlling the plotting of position displacement correction patterns (23*a*, 23*b*, 23*c*) (Step S202).

Then, in response to the activation of power, the image forming apparatus 100 plots position displacement correction patterns 23 including the multiplication error deviation correction pattern 23*b* (Step S203) and performs position displacement correction by performing multiplication error deviation correction based on the position displacement correction patterns 23 (Step S204). By performing the multiplication error deviation correction, multiplication error deviation correction amount i can be calculated.

Then, the image forming apparatus 100 uses the pattern plotting determination part 44 to determine whether the multiplication error deviation correction amount i obtained in Step S204 is no greater than a predetermined threshold (Step S205). It is to be noted that the predetermined threshold is stored in a storage area of a storage device (e.g., HDD 110) of the image forming apparatus 100 and is referred by the pattern plotting determination part 44.

In a case where the multiplication error deviation correction amount i is no greater than the threshold (Yes in Step S205), the pattern plotting determination part 44 sets the control value so that the position displacement patterns 23 are plotted without the multiplication error deviation correction pattern 23*b* (Step S206). In this case, the reset control value is set to maintain a state of not performing multiplication error deviation correction.

On the other hand, in a case where the multiplication error deviation correction amount i is greater than the threshold (No in Step S205), the pattern plotting determination part 44 sets the control value so that the position displacement patterns 23 are plotted including the multiplication error deviation correction pattern 23*b* (Step S207) In this case, the reset control value is set to maintain a state of performing multiplication error deviation correction.

Next, an embodiment of a pattern plotting operation is described with reference to FIG. 10 where a transition is made from a state of performing position displacement correction without multiplication error deviation correction to a state of performing position displacement correction including multiplication error deviation correction.

(Conditions for Recommencing Plotting of Multiplication Error Deviation Patterns)

The plotting of the multiplication error deviation correction pattern 23*b* (i.e. multiplication error deviation correction) may be recommenced (third determination part) based on the following conditions.

(Condition 2-1)

When printing more than a predetermined number of sheets (Condition 2-2)

When a predetermined time has elapsed (Condition 2-3)

When a detected amount of change of temperature and/or humidity surrounding the image forming apparatus (change of ambient condition(s)) is more than a predetermined value In this embodiment, the "predetermined number of sheets" is a predetermined number of sheets printed (number of sheets on which an image(s) is formed) during the state of performing no multiplication error deviation correction. Further, in this embodiment, "predetermined time" is a predetermined time elapsed from the state of performing no multiplication error deviation correction.

Figure 10:
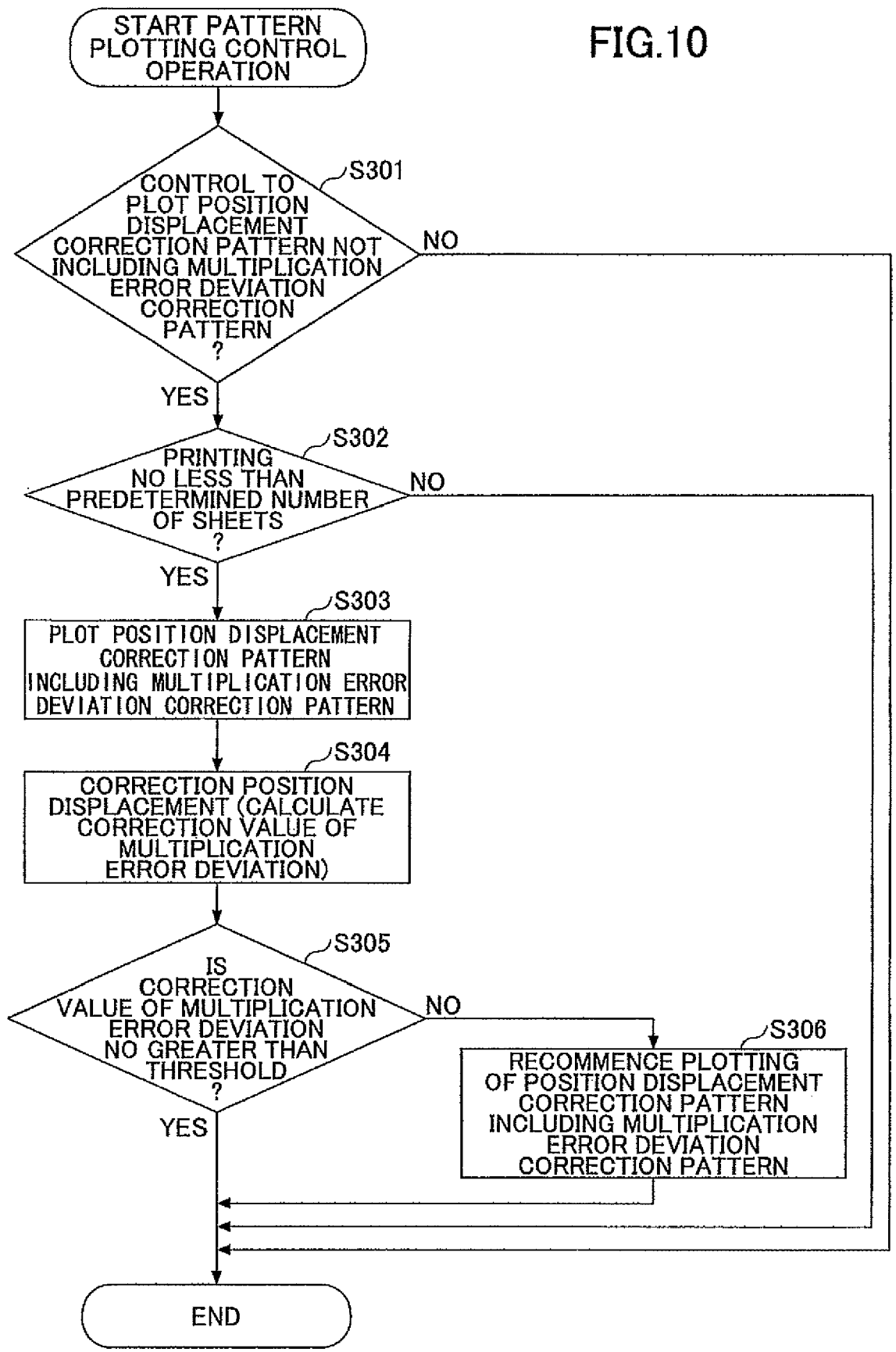
FIG. 10 is a flowchart illustrating the steps of another pattern plotting control operation according to an embodiment of the present invention.

FIG. 10 is a flowchart illustrating the steps of another pattern plotting control operation according to an embodiment of the present invention. In FIG. 10, the steps of the pattern plotting controlling operation are performed according to condition 2-1.

The image forming apparatus 100 determines whether the pattern plotting determination part 44 has instructed the plotting part 45 to plot position displacement correction patterns 23 without the multiplication error deviation correction pattern 23b and maintain the state of not plotting the multiplication error deviation correction pattern 23b (not performing multiplication error deviation correction) (Step S301).

In a case where the image forming apparatus 100 determines that the state of not plotting the multiplication error deviation correction pattern 23b is being maintained (Yes in Step S301), the image forming apparatus 100 determines whether the total number of sheets to be printed is greater than the predetermined number of sheets (Step S302).

In Step S302, in a case where the total number of sheets to be printed is greater than the predetermined number of sheets (Yes in Step S302), position displacement correction patterns 23 including the multiplication error deviation correction pattern 23b are plotted (Step S303) and position displacement correction is performed by performing multiplication error deviation correction based on the position displacement correction patterns 23 (Step S304). By performing the multiplication error deviation correction, the multiplication error deviation correction amount i can be calculated.

Then, the image forming apparatus 100 uses the pattern plotting determination part 44 to determine whether the multiplication error deviation correction amount i calculated in Step S304 is no greater than a predetermined threshold (Step S305).

In Step S305, in a case where the multiplication error deviation correction amount i is greater than the predetermined threshold (No in Step S350), the plotting of the multiplication error deviation correction pattern 23b is recommenced. In other words, the pattern plotting determination part 44 sets the control value so that position displacement patterns 23 including the multiplication error deviation correction pattern 23b are plotted (Step S306).

In this case, the control value is set to maintain a state of performing multiplication error deviation correction.

Further, in a case where the conditions of Step 301, Step S302, or Step S305 are not satisfied, the state of not performing multiplication error deviation correction is maintained.

Next, another embodiment of a pattern plotting control operation performed by the pattern plotting determination part 44 is described with reference to FIG. 11.

FIG. 11 is a flowchart illustrating the steps of yet another pattern plotting control operation according to an embodiment of the present invention.

The image forming apparatus 100 uses the pattern plotting determination part 44 to determine whether the multiplication error deviation correction amount i is no greater than a predetermined threshold and whether the number of times the multiplication error deviation correction amount i is calculated is no greater than a predetermined number of times (Step S401). It is to be noted that the predetermined threshold and the predetermined number of times are stored in a storage area of a storage device (e.g., HDD 110) of the image forming apparatus 100 and is referred by the pattern plotting determination part 44.

In Step S401, in a case where the multiplication error deviation correction amount i corresponding to at least one of black (BK), cyan (C), magenta (M), and yellow (Y) is no greater than the predetermined threshold and the number of times the multiplication error deviation correction amount i is calculated is no greater than the predetermined number of times (Yes in Step S401), the pattern plotting determination part 44 determines whether the multiplication error deviation correction amount i corresponding to all of the colors black (BK), cyan (C), magenta (M), and yellow (Y) satisfies the condition of Step S401 (Step S402).

In Step S402, in a case where the condition of Step S401 is satisfied for all of the colors (BK, C, M, Y) (Yes in Step S402), the pattern plotting determination part 44 sets the control value so that position displacement correction patterns 23 including the multiplication error deviation correction pattern 23b are plotted (Step S403). In this case, the control value is set to maintain a state of performing multiplication error deviation correction.

In Step S402, in a case where the condition of Step S401 is not satisfied for all of the colors (BK, C, M, Y) (No in Step S402), the pattern plotting determination part 44 sets the control value so that position displacement correction patterns 23 without the multiplication error deviation correction pattern 23b are plotted with respect to the color satisfying the condition of Step S401 (Step S404). In this case, the control value is set to maintain a state of performing multiplication error deviation correction depending on whether a predetermined conditions is satisfied with respect to color (BK, C, M, Y).

Further, in Step S401, in a case where the multiplication error deviation correction amount i is greater than the predetermined threshold or the number of times the multiplication error deviation correction amount i is calculated is greater than the predetermined number of times (No in Step S401), pattern plotting control is not performed.

With the above-described embodiment of the image forming apparatus 100, plotting of multiplication error deviation correction patterns 23b can be controlled based on the correction amount i of the multiplication error deviation calculated from the position displacement amounts a, b, and d. As a result, by controlling the plotting of the multiplication error deviation correction patterns 23b, the amount of toner consumed in positional misalignment correction can be reduced.

The above-described embodiment of the positional misalignment correction function of the image forming apparatus 100 is realized by allowing the CPU 108 to execute the steps described in FIGS. 3 and 9-11 in a program coded with a programming language corresponding to a desired platform. Accordingly, the program may be stored in a computer-readable recording medium 4 such as a floppy disk (registered trademark), a CD (Compact Disk), or a DVD (Digital Versatile Disk). Further, the program may be stored in the recording medium 104 and installed into the image forming apparatus 100 via the readable external storage I/F 12. Further, since the image forming apparatus 100 is equipped with the data communications I/F 14, the program may be downloaded from an electric communication line (e.g., the Internet) and installed in the image forming apparatus 100.

The present invention is not limited to the specifically disclosed embodiments, and variations and modifications may be made without departing from the scope of the present invention.

The present application is based on Japanese Priority Application Nos. 2007-340894 and 2008-316025 filed on Dec. 28, 2007 and Dec. 11, 2008, respectively, the entire contents of which are hereby incorporated herein by reference.

What is claimed is:

1. An image forming apparatus for detecting position displacement patterns and correcting position displacement of an image forming position in a main scanning direction according to the detection result, comprising:
 a position displacement amount calculating part configured to calculate the amount of the position displacement according to the detection result;
 a position displacement correcting part configured to correct the position displacement by performing at least one of multiplication correction or multiplication error deviation correction;
 a correction amount calculating part configured to calculate a multiplication error deviation correction amount for correcting multiplication error deviation generated by the multiplication correction;
 a first determining part configured to determine whether to plot a first position displacement correction pattern included in the position displacement patterns for performing the multiplication error deviation correction according to the multiplication error deviation correction amount; and
 a plotting part configured to plot the position displacement correction patterns.

2. The image forming apparatus as claimed in claim 1, wherein the first determining part is configured to compare the multiplication error deviation correction amount and a predetermined threshold and instruct the plotting part to plot the first position displacement correction pattern when the multiplication error deviation correction amount is greater than the predetermined threshold.

3. The image forming apparatus as claimed in claim 1, wherein the first determining part is configured to compare the multiplication error deviation correction amount and a predetermined threshold and instruct the plotting part to plot the first position displacement correction pattern with respect to each color when the multiplication error deviation correction amount is greater than the predetermined threshold.

4. The image forming apparatus as claimed in claim 1, further comprising:
 a second determining part configured to determine whether the number of sheets printed after stopping the plotting of the first position displacement correction pattern is greater than a predetermined number of sheets, whether a predetermined time has elapsed after plotting the first position displacement correction pattern, or whether a detected amount of change of an ambient condition surrounding the image forming apparatus is greater than a predetermined value and instruct the plotting part to plot the first position displacement correction pattern when the printed number of sheets is greater than the predetermined number of sheets, when the predetermined time has elapsed, or when the detected amount of change is greater than the predetermined value.

5. The image forming apparatus as claimed in claim 1, further comprising:
 a third determining part configured to determine whether power of the image forming apparatus is switched on, whether an image transferring member is replaced, or whether an image carrier is replaced and instruct the plotting part to plot the first position displacement correction pattern when determining that the power is switched on, when determining that the image transferring member is replaced, or when determining that the image carrier is replaced.

* * * * *